United States Patent [19]

Ackeret

[11] Patent Number: 4,817,314
[45] Date of Patent: Apr. 4, 1989

[54] CONTAINER FOR ACCOMMODATING A PILE OF PICTURES

[75] Inventor: Peter Ackeret, Kusnacht, Switzerland

[73] Assignee: Licinvest AG, Chur, Switzerland

[21] Appl. No.: 59,873

[22] PCT Filed: Oct. 29, 1986

[86] PCT No.: PCT/EP86/00623
§ 371 Date: Jun. 11, 1987
§ 102(e) Date: Jun. 11, 1987

[87] PCT Pub. No.: WO87/03106
PCT Pub. Date: May 21, 1987

[30] Foreign Application Priority Data

Nov. 6, 1985 [DE] Fed. Rep. of Germany ....... 3539297

[51] Int. Cl.$^4$ .............................................. G09F 11/30
[52] U.S. Cl. ........................................ 40/513; 40/152
[58] Field of Search ........................... 40/511, 513, 152

[56] References Cited

U.S. PATENT DOCUMENTS 3,069,795 12/1962 Lieberman ............................. 40/152
3,237,333 3/1966 Bacharach ............................. 40/152
4,376,348 3/1983 Ackeret ............................. 40/511 X

FOREIGN PATENT DOCUMENTS

86/03021 5/1986 PCT Int'l Appl. .

Primary Examiner—Robert G. Nilson
Attorney, Agent, or Firm—Robert R. Jackson

[57] ABSTRACT

The invention relates to a container for a pile of substantially rectangular pictures of like format, having a housing which has a viewing window for displaying the picture lying facing the window, a slider member that can be pulled out of the housing and pushed back into the housing again parallel to the plane of the window, and —preferably— having a change mechanism which takes a picture from one end of the pile when the housing and the slider member are pulled apart and returns it to the other end of the pile when they are pushed back together again, centering means being provided which align at least the picture facing the window with respect to the center of the window, and wherein the window is larger than the format of the picture, but parts of the inside of the container that are underneath those surface portions of the window that extend beyond the edges of the picture are masked.

40 Claims, 3 Drawing Sheets

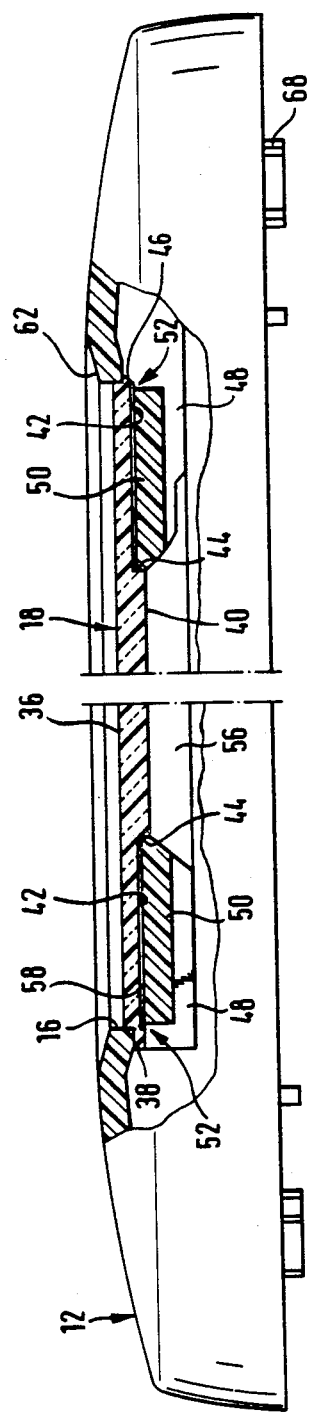
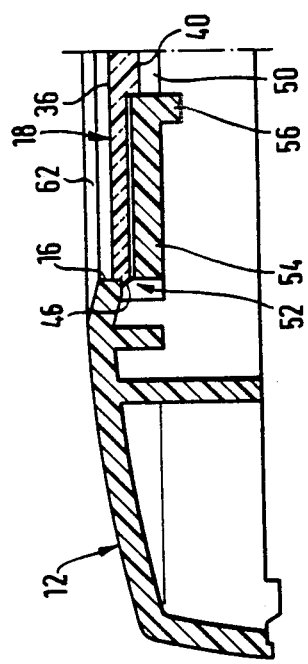
FIG. 2
FIG. 3

CONTAINER FOR ACCOMMODATING A PILE OF PICTURES

The invention relates to a container for accommodating a pile of pictures having a housing that has a viewing window for looking at the uppermost picture in the pile and having a slider member which can be pulled out of the housing parallel to the plane defined by the window. When such a container is designed as a picture changer, as described, for example, in U.S. Pat. Nos. 4,238,898, 4,238,899, 4,241,528, 4,241,529, 4,245,417, 4,259,802 and 4,376,348, the pile of pictures is rearranged cyclically by pulling the slider member out and pushing it in again. The components necessary for this function, the so-called change mechanism, requires a certain amount of space in the container, especially in front of and behind the pile in the direction of movement of the slider member. In order to prevent these parts from being seen through the window when the slider member has been pushed in, that is to say, for example, when the container is being used as a standing or hanging frame, the relevant edges of the window are substantially congruent with the visible picture, that is, at a distance from the edges of the housing parallel to them. And in order that the container still looks attractive, a suitable distance is also provided between the edges of the window perpendicular to the mentioned edges and the edges of the housing parallel thereto. In this manner the window is surrounded, passe-partout-like, by outer surface regions of the housing.

Such containers are intended primarily for photographic prints. The formats most commonly used for photographic prints are, however, relatively small in relation to the amount of space required by the change mechanism, with the result that the regions of the housing that surround the window in the manner of a passe-partout appear disproportionately wide. The problem on which the invention is based is to provide a container which is also suitable as a picture changer and in which the width of the passe-partout regions can be freely selected within wide limits with the given outer dimensions of the contour of the container.

This problem is solved by means of the features indicated in patent claim 1; the dependent claims define preferred and/or advantageous developments of this design.

The invention is explained in detail below with reference to the embodiment shown in the enclosed drawings;

FIG. 2 shows sections of an upper shell for the container in FIG. 1 in a side view, partially in section.

FIG. 3 shows, in section, sections of a corner of the upper shell in FIG. 2, perpendicular to the view in FIG. 2.

Figure 1:
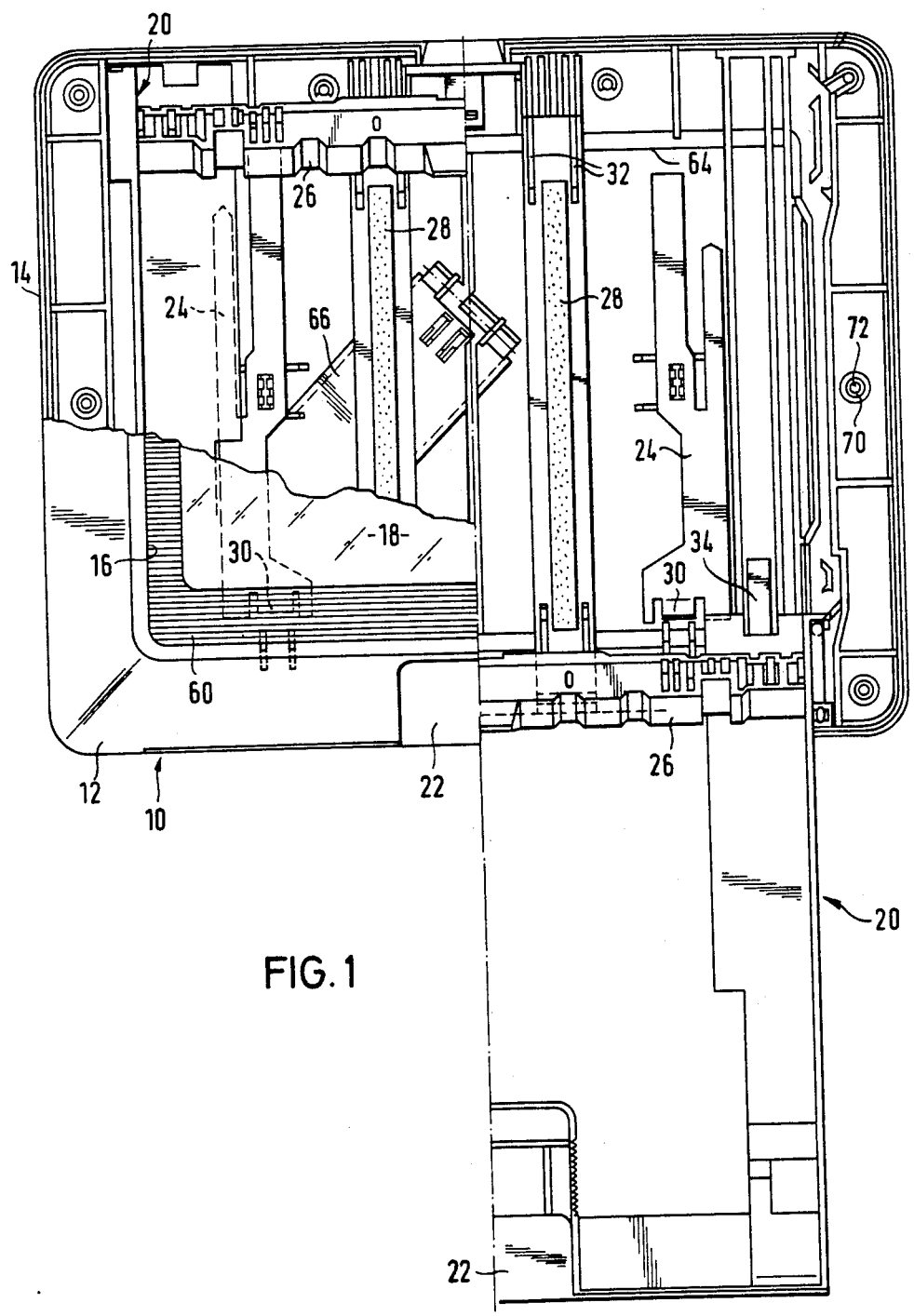
FIG. 1 is a plan view of a container designed as a picture changer, in part in section and in part with the slider member withdrawn.

The picture changer shown has a housing 10 which comprises an upper shell 12 and a lower shell 14 which, as shown, are connected to one another by screws or by welding, snap-fit means or the like. The upper shell 12 has a substantially rectangular or square cut-out 16 for a window 18 which is surrounded, passe-partout-like, by the upper shell 12.

The housing 10 accommodates a slider member 20 which is provided with a grip part 22 and is guided displaceably in the housing 10, for which purpose the slider member 20 can be grasped by the grip part 22 which is accommodated by corresponding recesses in the upper and lower shells 12, 14 when the slider member 20 has been pushed in. The slider member 20 accommodates a pile of pictures which, when the slider member 20 is pushed in, is pressed by springs 24 in the direction towards the window 18.

Also provided is a separating device which serves to separate an individual picture from the pile of pictures. The separating device comprises a separator 26 which is secured to the slider member 20 on the side opposite the grip part 22.

A retaining means is provided which holds the picture separated from the pile of pictures by the separating device in the housing 10 when the slider member 20 is pulled out of the housing 10, while the remainder of the pile is pulled out of the housing 10 with the slider member 20. The retaining means comprises a retentive coating 28 on the inside of the housing 10 facing the window 18.

A feed device serves to feed pictures to the separating device. It comprises hook-like members 30 on the sides of the springs 24 facing the grip part 22. The hook-like members 30 serve to press the pictures in the pile against the separator 26 in a staggered manner during the change operation and to hold the last picture in the pile in a gap between the separator 26 and the retentive coating 28, the separator 26, during the beginning of the change operation, at first running over rails 32 against which the last picture is pressed so that the separator 26 can travel over this last picture.

The last picture in the pile, which remains in the housing 10 in the change operation, is lifted progressively by a guide device comprising the springs 24 and further lifting springs 34 in the direction of the window 18 as the slider member 20 is pulled out, with the result that as the slider member 20 is pushed back in again it passes to the other end of the pile of pictures.

The details of the change mechanism and of the change operation are not described as they are not relevant to the present invention and corresponding material can be found in any case in the patent specifications listed at the beginning.

The window 18 has on one side a plurality of projections 38 spaced apart and at a lower level than the outer surface 36 of the window, recesses 42 being provided on the inside surface 40 of the window in the region of the projections 38 which recesses are bounded at the side by the projections 38 and opposite thereto by a shoulder 44. The undersides of the projections 38 are offset somewhat towards the outer surface 36 of the window in relation to the inner surface 40 of the window.

At least on the opposing sides, and preferably on all three remaining sides, the window 18 also has recesses 42 which are also bounded by a shoulder 44, but on these sides, instead of projections 38, there are barbed projecting snap-in lugs 46. The window 18 has an outline corresponding to the cut-out 16 in the upper shell 12, the projections 38 and the snap-in lugs 46 projecting outwardly with respect to this outline.

The upper shell 12 has ribs 48, extending in the direction of movement of the slider member 20, adjacent to the edges of the window 18 which extend transversely to the direction of movement of the slider member 20, the ribs 48 extending up to a predetermined distance inwards in the direction of the window 18 and downwards towards the inside of the housing 10. The ribs 48 are joined together at the top on each side of the window 18 by a bar 50, openings 52 corresponding to the projections 38 and snap-in lugs 46 on the window 18 being arranged between the bar 50 and the adjacent part of the upper shell 12 that defines the cut-out 16.

On the two remaining opposite sides of the cut-out 16, the upper shell 12 has bars 54, each with a continuous longitudinal rib 56 on the inside of the bars 54, which extends inwards the length of the ribs 48. Openings 52 are also provided in this case in the region of the snap-in lugs 46. The ribs 48 and the longitudinal ribs 56 serve to support the uppermost picture in the pile. The longitudinal ribs 56 extend further in than the upper edges of the slider member 20 so that no pictures can escape outwards sideways over the slider member 20. The separator 26 or, if there is no change function, the back wall of the slider member 20, extends higher than the ribs 48 and has corresponding cut-outs, with the result that the separator 26 can pass over the ribs 48.

The window 18 is inserted by means of the projections 38 into the openings 52 provided for that purpose and then the snap-in lugs 46 are snapped in by pushing the window 18 in under the upper shell 12 in the region of the associated openings 52. Here the recesses 42 are of such a size that when the lugs have been snapped in sufficient play 58 remains between the undersides of the recesses 42 and the top of the bars 50, 54 for the snap-in operation to be carried out. Otherwise, the window 18 rests on the bars 50, 54 which therefore support the window 18 from below in the region of the outer edges, the shoulders 44 of the recesses 42 resting on the adjacent edges of the bars 50, 54.

In the region in which the bars 50, 54 are located, the window 18 is provided with a circumferential roughened portion 60 which, passe-partout-like, surrounds the actual viewing window and acts as a second passepartout. The roughened portion 60 may also be provided on the housing side of the bars 50, 54.

The upper shell 12 is provided adjacent to the cut-out 16 with a bevelled portion 62 directed inwards towards the window 18, which bevelled portion corresponds to a corresponding flat projection 64 on the underside of the lower shell 14, with the result that the containers can easily be stacked; in a stack of containers the projection on the underside does not reach as far as the window 18 of the container underneath it in the stack and cannot therefore scratch this window. In the projection 64 on the underside is a recess for accommodating a stand 66 which is hinged to the lower shell 14 in such a manner that it can be folded out.

The bars 50, 54 and the roughened portion 60 at the same time cover the parts under them. The cut-out formed by the bars 50, 54 and the roughened portion 60 corresponds substantially to the smallest picture of the pictures with tolerance in the pile. With photographic prints, the greatest tolerances are at the cut edges (approximately ±0.5 cm) as the photographic prints are cut from a roll which has relatively low tolerances across its width—as well as from roll to roll. In the embodiment shown the relatively large tolerances occur transversely to the direction of withdrawal of the slider member 20, with the result that the slider member must be correspondingly wide in order to accommodate even the largest photographic prints. The photographic prints are centered with respect to the window 18 with the aid of centering means.

The housing 10, the slider member 20 and the window 18 are injection-moulded plastics parts. The upper shell 12 has in its edge region sleeves 68 directed towards the lower shell 14 while the lower shell 14 has corresponding sleeves 70, aligned with the sleeves 68, which are open towards the underside of the container. Introduced into the sleeves 70 from below are screws 72 with self-tapping threads which are screwed into the sleeves 68 in the upper shell 12. As a result, the upper and lower shells 12, 14 are joined together in preferred manner, without welding, in the region of a cavity between the upper and lower shells 12 and 14 on three sides of the container.

Figure 4:
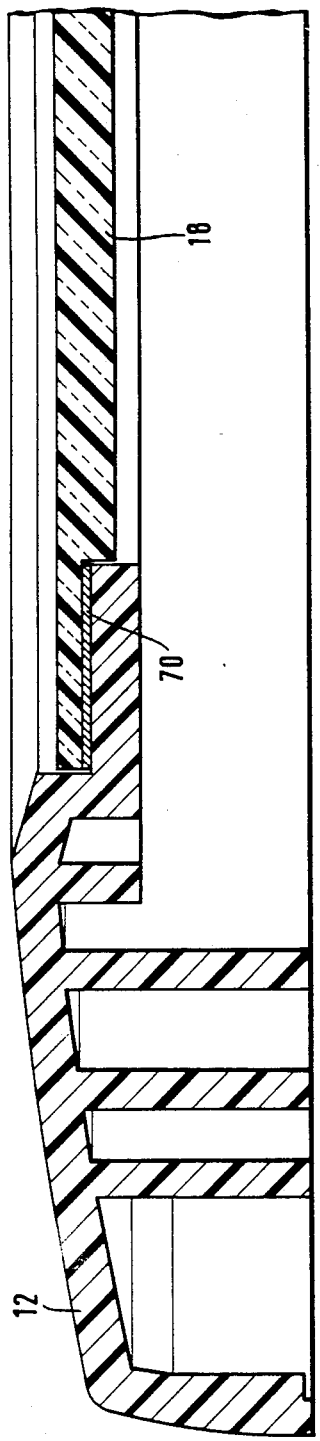
FIGS. 4 and 5 show an alternative embodiment, analogously to FIG. 3.
Figure 5:
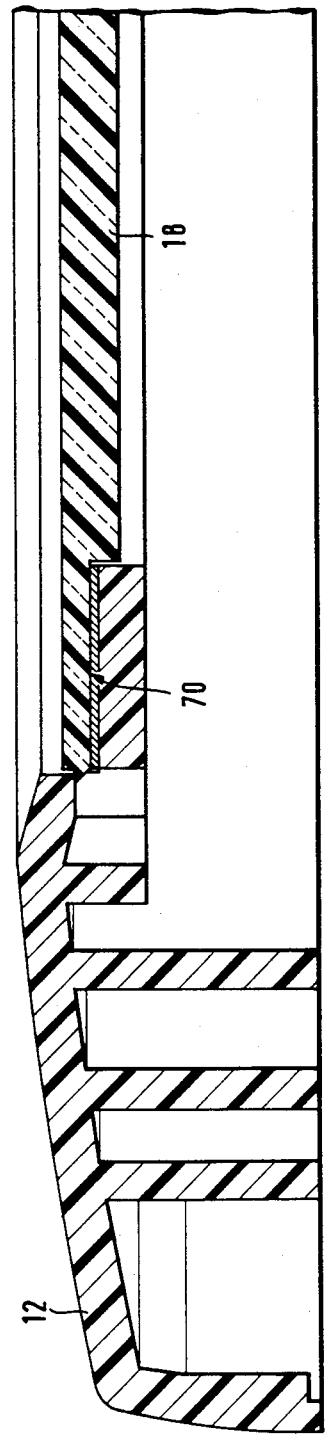

FIGS. 4 and 5 show, in two different sectional planes and enlarged with respect to FIG. 3, an embodiment in which a frame-like decorative masking means 70 is inserted between the window 18 and the upper shell 12 of the housing. FIG. 4 is a section in the unanchored region of the window element, while FIG. 5 corresponds to FIG. 3. The decorative masking means 70 may consist of opaque material, for example coloured printed paper, or of a transparent film with decorative ornaments.

I claim:

1. A container for a stack of substantially rectangular pictures comprising a housing having a large side, a display opening in said large side permitting display of a picture therebeneath, a slider reciprocable relative to said housing in a direction parallel to said large side, means for aligning said picture relative to said display opening, a recess in said large side, the recess having dimensions exceeding those of said display opening, a transparent pane inserted into said recess from the exterior of said housing, support elements extending from the contour of said recess toward said display opening and beneath said pane so as to support it against the interior of the container, and means for masking the housing interior between said display opening and said recess contour so as to cover said aligning means.

2. A container for a stack of substantially rectangular pictures comprising a housing having a large side, a display opening in said large side so as to expose a picture therebeneath, a transparent pane inserted into said large side and having dimensions exceeding those of said display opening, said large side having a recess defined by surface portions extending transverse to a plane defined by said pane, said pane being inserted into said recess from the exterior of said housing, said pane being supported against the interior of the housing by support elements extending from the contour of said recess toward said display opening and beneath said pane, and said pane being snap-fitted to said surface portions so as to retain it in said recess.

3. A container for a stack of substantially rectangular pictures comprising a housing having a large side, a display opening in said large side so as to expose a picture therebeneath, said large side having a recess dimensioned larger than said display opening, a transparent pane being inserted into said recess from the exterior of the housing and supported against the interior of the housing by support elements which extend toward said display opening from the contour of said recess and beneath said pane, and a mask being inserted between said pane and said support elements, the mask having an outer contour congruent with the contour of said recess and an inner contour defining said display opening, the mask covering said support elements.

4. The container of claim 2 including means for aligning said picture beneath said display opening relative to said opening, and including means for masking the housing interior between said opening and the contour of said recess so as to cover said aligning means.

5. The container of claim 1 wherein said means for masking include a mask having an outer contour congruent with that of said recess and an inner contour defining said display opening, said mask being inserted between said pane and said support elements.

6. The container of claim 3 wherein said recess is defined by said pane, and said pane being snap-fitted to said surface portions.

7. The container of claim 6 including a mask inserted between said pane and said support elements so as to cover said support elements.

8. The container of claim 1 or 2 or 3 wherein said pane exceeds the dimension of said display opening at two opposing edges.

9. The container of claim 1 or 2 or 3 wherein said pane is longer and larger than said display opening.

10. The container of claim 1 or 2 wherein said pane is made of transparent plastic material, its side facing the housing interior having a surface structure rendering it non-transparent between said display opening and said recess contour.

11. The container of claim 1 or 2 wherein said support elements are opaque and define said display opening.

12. The container of claim 1 or 2 wherein said pane is printed with opaque material at its side facing the housing interior between its outer contour and the contour of said display opening.

13. The container of claim 1 or 2 or 3 wherein said recess contour is substantially equally spaced from an outer housing contour.

14. The container of claim 1 including means for cyclically exchanging the pictures forming said stack upon reciprocation of said slider.

15. The container of claim 1 or 2 or 3 wherein said recess contour is connected via steps to surrounding surfaces of said housing large side.

16. The container of claim 3 including stop means for positioning said mask and said pane.

17. The container of claim 3 wherein said mask is made of opaque material.

18. The container of claim 3 wherein said mask is made of transparent material and provided with decorative ornaments.

19. The container of claim 2 wherein said surface portions extend orthogonal with respect to said plane.

20. The container of claim 2 wherein said support elements are extensions of said surface portions.

21. The container of claim 2 including support elements for at least two opposing pane edges.

22. The container of claim 21 wherein said support elements form contiguous surfaces.

23. The container of claim 21 wherein said support elements form a frame-shaped contiguous surface.

24. The container of claim 2 including snap-fit connections at two opposing pane edges.

25. The container of claim 24 wherein said snap-fit connections are provided adjacent to a central portion of said pane edges.

26. The container of claim 2 wherein said surface portions have indentations and said pane has projections snap-fitted into said indentations.

27. The container of claim 26 wherein said indentations are apertures extending through walls having said surface portions.

28. The container of claim 6 or 7 wherein said projections are wedge-shaped.

29. The container of claim 1 or 2 or 3 wherein said pane has a relatively thick portion congruent with said display opening and a relatively thin portion supported by said support elements.

30. The container of claim 1 wherein said aligning means extend parallel to said direction.

31. The container of claim 30 including rib-shaped aligning means.

32. The container of claim 1 wherein said aligning means include a plurality of ribs adjacent at least one pane edge extending transverse to said direction.

33. The container of claim 1 including alignment means integrally formed with said support elements.

34. The container of claim 1 including aligning means on said slider.

35. The container of claim 34 wherein said slider has walls extending in said direction and forming aligning means.

36. The container of claim 34 or 35 wherein said slider has a grip portion having an aligning edge which extends transverse to said direction.

37. The container of claim 34 wherein said slider has a separator bar extending transverse to said direction and having an aligning surface.

38. The container of claim 1 including an aligning stop member integrally formed to an inner face of said large housing side.

39. The container of claim 38 wherein said stop member is step-shaped and extends transverse to said direction.

40. The container of claim 3 wherein said mask and said support elements have congruent inner contours.

* * * * *